(12) United States Patent
Sha et al.

(10) Patent No.: US 12,360,284 B2
(45) Date of Patent: Jul. 15, 2025

(54) MODEL TEST APPARATUS AND METHOD FOR SHIELD TUNNEL POST-WALL GROUTING AND TUBE SHEET UPLIFT UNDER HIGH WATER PRESSURE CONDITIONS

(71) Applicant: Ocean University of China, Shandong (CN)

(72) Inventors: Fei Sha, Shandong (CN); Hao Kong, Shandong (CN); Tao Liu, Shandong (CN); Rui Fan, Shandong (CN); Mingshuai Xi, Shandong (CN); Shijiu Gu, Shandong (CN); Meng Bu, Shandong (CN)

(73) Assignee: Ocean University of China, Shandong (CN)

( * ) Notice: Subject to any disclaimer, the term of this patent is extended or adjusted under 35 U.S.C. 154(b) by 344 days.

(21) Appl. No.: 18/301,258

(22) Filed: Apr. 17, 2023

(65) Prior Publication Data

US 2023/0333279 A1    Oct. 19, 2023

(30) Foreign Application Priority Data

Apr. 19, 2022 (CN) .......................... 202210407389.6

(51) Int. Cl.
  *G01V 20/00*   (2024.01)
  *E21D 11/10*   (2006.01)
(52) U.S. Cl.
  CPC .............. *G01V 20/00* (2024.01); *E21D 11/10* (2013.01)
(58) Field of Classification Search
  CPC .................................................... G01V 20/00
  See application file for complete search history.

(56) References Cited

U.S. PATENT DOCUMENTS

| 12,285,166 B2* | 4/2025 | Leimbach | H01R 39/08 |
| 2015/0338549 A1* | 11/2015 | Li | G01V 20/00 |
| | | | 703/6 |

(Continued)

FOREIGN PATENT DOCUMENTS

| CN | 207620797 | 7/2018 |
| CN | 109826652 | 5/2019 |

OTHER PUBLICATIONS

"Office Action of China Counterpart Application", issued on Dec. 2, 2022, p. 1-p. 4, 202210407389.6.

*Primary Examiner* — Eric S. McCall
(74) *Attorney, Agent, or Firm* — JCIPRNET

(57) ABSTRACT

This invention discloses a model test apparatus and method for shield post-wall grouting and tube sheet uplift under high water pressure conditions, comprising main body box, tension apparatus, shield system, grouting system, ground stress loading system, water injection system, and monitoring system. The main body box comprises the shield shell system and model soil inside. The ground stress loading system and water injection system realize the simulation of the complex underground soil and muddy water environment by applying stress and water pressure to the model soil inside the main box. While the tension apparatus makes the shield shell moving forward, the grouting system injects slurry into the gap between the shield shell and the tube sheet. The integrated model test of visual shield grouting and tube sheet uplift, the real-time multi-physical field responses, and the longitudinal deformation mechanism have been realized and revealed under high water pressure conditions.

19 Claims, 13 Drawing Sheets

(56) References Cited

U.S. PATENT DOCUMENTS

2023/0060186 A1* 3/2023 Huang ................ G01M 5/0066
2023/0335014 A1* 10/2023 Sha ........................ G09B 25/00
2024/0410280 A1* 12/2024 Lei ........................... E21D 9/14

* cited by examiner

MODEL TEST APPARATUS AND METHOD FOR SHIELD TUNNEL POST-WALL GROUTING AND TUBE SHEET UPLIFT UNDER HIGH WATER PRESSURE CONDITIONS

CROSS-REFERENCE TO RELATED APPLICATION

This application claims the priority benefit of China application serial no. 202210407389.6, filed on Apr. 19, 2022. The entirety of the above-mentioned patent application is hereby incorporated by reference herein and made a part of this specification.

TECHNICAL FIELD

This invention refers to the technical field of shield tunnel grouting and tunnel stability, specifically, it refers to a model test apparatus and method for shield tunnel post-wall grouting and tube sheet uplift under high water pressure conditions.

BACKGROUND

In recent years, tunnels and urban underground transportation projects have developed rapidly in major cities in China, and underwater shield tunnel construction has been applied widely with good techniques. However, as the diameter and water pressure of the underwater shield tunnel increase, the difference between the buoyancy force on itself and the self-weight of the pipe sheet increases, which results in that it is easier for the shield tunnel structure to uplift. The larger uplift may lead to a series of hazards such as cracking, misalignment, and cracks in the pipe sheet. Grouting technology is an effective method to ensure the safe construction of underwater shield tunnels, it can prevent tube sheet uplift and stratigraphic disturbance effectively. Therefore, it is especially important to study the grouting process law and tube sheet uplift of shield tunnels under high water pressure conditions.

At present, there are few studies on the model tests of shield tunnel post-wall grouting and tube sheet uplift under highwater pressure conditions, and the main deficiencies are as follows: on the one hand, during the slurry filling process of shield tunneling, the slurry filling reinforcement of first front rings of the tube sheet often has a non-negligible uplift effect on the later tube sheet rings, and most model test systems tend to use a single tube sheet to investigate the tube sheet uplift. On the other hand, the tube sheet is often fixed in the indoor model test, and the study of tube sheet uplift by other means instead cannot reflect the real situation of soil stress and the effect of slurry filling reinforcement on the tube sheet uplift during the actual shield construction. In addition, the influence of the clearance distance between the pipe sheet and the shield shell is not considered usually in the relevant indoor model tests. The gap size between the shield shell and the pipe sheet affects the filling effect of grouting and the strength of grouting reinforcement, which further affects the uplift of the pipe sheet and soil disturbance. Therefore, the study on the gap between the shield shell and the pipe sheet cannot be neglected.

Shield construction often encounters complex strata and high water pressure environments, the existence of mud and water environment under high water pressure in soft strata is ignored in relevant indoor model tests, and in further, simulation of slurry filling behind shield tunnel wall is less especially under mud and water environment. How to study the effect of slurry filling and tube sheet uplift law under high water pressure and complex formation environment is also an urgent content or task.

SUMMARY

To solve the above problems, the present invention proposes a model test apparatus and method for shield tunnel post-wall grouting and tube sheet uplift under highwater pressure conditions, which can simulate the total process of shield tunnel post-wall slurry filling in high water-pressure mud and water environment, measure the floating situation of multi-ring tube sheet and simulate the slurry filling effect and mechanism under the influence of many different factors. It has the advantages of easy operation, complete structure, and reusability.

The specific technical solution of the invention is as follows:

A model test apparatus for shield tunnel post-wall grouting and tube sheet uplift under high water pressure conditions, comprising a main body box, a tension apparatus, a shield system, a grouting system, a ground stress loading system, a water injection system and a monitoring system.

Claimed upper face of the main body box is open, claimed main body box is made up of visual material, claimed front face of the main body box is provided with shield shell holes.

Claimed shield system comprises a shield shell and several tube sheets, claimed shield shell being located within the claimed main box, the front end of claimed shield shell being placed in claimed shield shell aperture, and claimed tube sheets being placed sequentially within the shield shell.

Claimed main body box filled with model soil, claimed open mouth of the main box with a loading plate, claimed ground stress loading model system with the loading plate on the model soil for ground stress loading simulation, water injection system through the water pipe connected to the main body box located in the model soil above the shield shell for high water pressure mud and water environment simulation.

The tension apparatus is connected to the front end of claimed shield shell, and the delivery tube of claimed grouting system is installed in claimed shield shell, and while the tension apparatus moves outward the shield shell in a horizontal digging motion, the grouting system injects grout through the delivery tube into the gap formed between the tube sheet and the model soil.

Claimed monitoring system is used to monitor and collect the relevant test parameters of the model soil in the main box.

Further, claimed shield shell is composed of an annular steel plate, claimed shield shell that has many adjustable pulleys fixed along the circumference of the inner wall and several wheel surfaces of adjustable pulleys supporting the outer wall of claimed pipe sheet.

Claimed tube piece is composed of spliced ring structure, the head and tail of adjacent tube pieces are connected by bolts, and the front end of the claimed shield is provided with a cover plate and claimed cover plate is provided with a third interface connecting to a claimed tension apparatus.

Further, claimed adjustable pulley comprises a pulley, a bolt cap, a torsion strut, and chassis support, claimed chassis support is attached to the claimed inner wall of claimed shield shell by bolt holes IV on its both sides, and claimed torsion strut is attached to the upper part of claimed chassis support, claimed torsion strut being threaded to claimed bolt cap on the upper part, claimed bolt cap being attached to the claimed pulley by bolt holes III around the top of claimed bolt cap.

Further, claimed inner wall of the rear end of claimed shield shell is provided with an annular barrier plate, several grouting holes have been set along the circumferential direction on the plate surface, claimed the grouting system has a plurality of slurry tubes connecting to the liquid delivery pipe, claimed slurry tubes are located in the gap between the shield shell and the tube sheet, claimed slurry tubes are connected to claimed grouting holes correspondingly.

Further, claimed water injection system includes a first air compressor, air delivery pipe I, air pressure regulator I, water storage tank, water pressure gauge, and water delivery pipe; claimed water storage tank and the first air compressor are connected to the air delivery pipe I, claimed air pressure regulator I is installed on claimed air delivery pipe I, the outlet of the claimed water storage tank is connected to claimed water delivery pipe, claimed water delivery pipe is inserted into the model soil after penetrating claimed loading plate, is valve I is installed on the claimed water delivery pipe, and the upper part of the water storage pipe is connected to a water pressure gauge.

Further, claimed ground stress loading system includes a jack and a test frame, claimed test frame is a gantry-type structure, claimed body box is located in the doorway of the claimed test frame, the jack is connected to the top of claimed test frame, and the loading end of the jack is connected to the loading plate.

Further, the monitoring system includes a monitoring element, a signal line, and a data acquisition processor, the monitoring element includes a displacement sensor, a soil pressure sensor, and a dynamic water pressure sensor, the monitoring element is placed within the model soil and the monitoring element is connected to the data acquisition processor through a signal line.

Further, the body box consists of a removable front main board, a rear main board, left and right-side panels, and the grid lines are provided on the face of the side panels.

The model test method for testing shield tunnel post-wall grouting and tube sheet uplift under high water pressure condition, using the model test apparatus for shield tunnel post-wall grouting and tube sheet uplift under high water pressure condition as described in the present invention, comprising the following steps:

Step 1: Installing the main body box and the ground stress loading system;

Step 2: Installing the shield system, embedding the shield shell into the main body box at the shield shell hole, embedding a plurality of pipe pieces into the rear position of the shield shell, connecting the last pipe piece with the rear main board of the main body box with bolts, and connecting the tension apparatus with the front end of the shield shell;

Step 3: Installing the grouting system;

Step 4: Installing the water injection system;

Step 5: Filling the main body box with model soil, burying displacement sensors, soil pressure sensors, and dynamic water pressure sensors in the model soil, and install the loading plate in the upper part of the model soil, the loading plate is connected to the ground stress loading system;

Step 6: Applying water pressure, the water is injected into the model soil by the water pipeline of the injection system;

Step 7: Applying the ground stress, the ground stress loading system makes sure that the load transfer in the model soil evenly by the loading plate, after reaching the ground stress of the desired environment, stop loading;

Step 8: Starting the tension apparatus to move the shield shell outward for horizontal digging movement, while the shield shell is moving, the grouting system injects grout into the gap generated between the pipe piece and the model soil through the slurry delivery pipe; when the shield shell advances one ring, release the constraint between the pipe piece at the last end and the main board behind the main body box;

Step 9: After grouting is finished, collect data through the monitoring system, summarize the uplift law of shield segment and the grouting diffusion reinforcement pattern of shield segment in different rings, and evaluate the effect of shield post-wall synchronous grouting;

Step 10: Repeat the above steps (Step 1-9), set different parameters such as ground stress pressure, water pressure, slurry type, grouting volume, grouting pressure, gap between shield shell and pipe sheet, and shield boring speed, and complete the shield post-wall synchronous grouting test under different conditions.

Further, in step 5, the model soil in the upper part of the shield shell is silty powdery clay and powdery clay, the model soil in the lower part of the shield shell is medium-coarse sand, and the model soil is silty-fine sand in the process of shield boring.

In comparison with existing technology, the beneficial advantages achieved by the present invention are as follows.

(1) The present invention can restore the underwater shield post-wall synchronous slurry filling project under high water pressure condition with a reducing size, it especially can simulate the operation state and construction environment of shield post-wall synchronous slurry filling project under high water pressure and soft strata conditions with a reducing size. It can real-time feedback the multi-physical field of the strata and can realize the perception of tube sheet uplift state and law during shield boring processes.

The main box is made up of visual material, which is convenient to observe the floating state of each tube piece intuitively and improve the test efficiency.

(2) The present invention simulates the ground stress of the model soil layer through the ground stress loading system, it simulates the high water-pressure muddy environment of the model soil layer through the high-pressure water injection system, realizing the simulations of the ground stress at different stratigraphic depths and high water-pressure muddy environments.

(3) This invention can study the shield post-wall grouting mechanism and the uplift variation law of shield pipe sheet deeply by systematically setting a variety of key influence factors such as the speed of shield boring, the gap between shield shell and pipe sheet, grouting pressure, slurry filling volume, etc.

(4) This invention can present the visual shield post-wall slurry filling process and the dynamic uplift effect of shield tube sheet. After adding the monitoring system, this invention can measure key parameters such as stress, seepage pressure, and deformation of model soil more accurately, and it can obtain the uplift law of shield tube sheet and the longitudinal deformation law of shield boring effectively.

Figure 1:
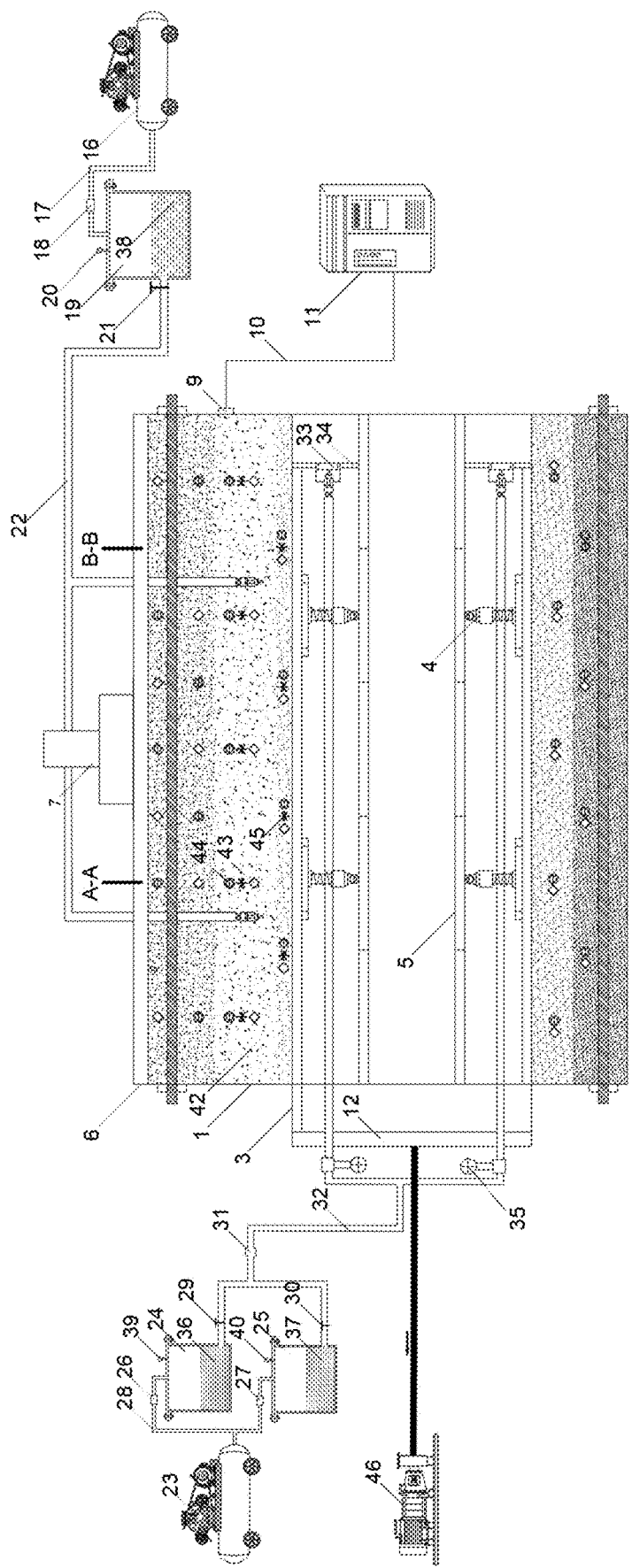
FIG. 1 shows the schematic plan view of the structure provided by this present invention.

In the Figures: 1. main body box; 2. shield shell hole; 3. shield shell; 4. adjustable pulley; 5. pipe piece; 6. loading plate; 7. jack; 8. test frame; 9. first outlet; 10. a signal line; 11. data acquisition processor; 12. cover plate; 13. the first interface; 14. the second interface; 15. the third interface; 16. The first air compressor; 17. air transmission pipe I; 18. air pressure regulator I; 19. water storage tank; 20. water pressure gauge; 21. the valve I; 22. water delivery pipe; 23. the second air compressor; 24. liquid storage tank I; 25. liquid storage tank II; 26. air pressure regulator II; 27. air pressure regulator III; 28. air delivery pipe II; 29. valve II; 30. valve III; 31. double liquid mixer; 32 liquid delivery pipe; 33. slurry injection port; 34. barrier plate; 35. flow recorder; 36. first slurry; 37. second slurry; 38. water; 39. pressure gauge I; 40. pressure gauge II; 41. fourth interface; 42. model soil; 43. displacement sensor; 44. soil pressure sensor; 45. dynamic water pressure sensor; 46 tension apparatus; 101. front main board; 102. side plate; 103. bolt hole I; 104. bolt hole II; 105. rear main board; 106. bolt hole V; 401 pulley; 402. bolt hole III; 403. bolt cap; 404. torsion strut; 405. bolt hole IV; 406 chassis support.

DETAILED DESCRIPTION OF THE EMBODIMENTS

The invention is further described below in conjunction with the accompanying drawings and examples.

It should be noted that the following detailed descriptions are illustrative and are intended to provide further clarification of the present application. Unless otherwise indicated, all technical and scientific terms used herein have the same meaning as commonly understood by one of ordinary skill in the art to which the present application belongs.

It is noted that the terms used herein are intended to describe specific embodiments only and are not intended to limit the exemplary embodiments according to the present application. As used herein, unless the context indicates otherwise, the singular form is also intended to include the plural form, and it is also to be understood that when the terms "comprising" and/or "including" are used in this specification, they indicate the presence of features, steps, operations, apparatus, components, and/or combinations. The term "includes" and/or "includes" is used in this specification to indicate the presence of features, steps, operations, apparatus, components, and/or combinations.

In the present invention, the orientation or position relationship indicated by "top", "bottom", "left", "right", "front", "back", "vertical", "horizontal", "side", "bottom", etc. is based on the orientation or position relationship shown in the accompanying drawings, and is only a relationship term determined for facilitating the description of the structural relationship of the parts or components of the present invention, and does not refer specifically to any part or component of the present invention, and cannot be understood as a limitation of the present invention.

In the present invention, terms such as "fixed", "connected", etc. shall be understood in a broad sense, indicating that they can be connected fixedly, connected integrally, or connected detachably. It can be connected directly or indirectly through an intermediate medium. For the relevant scientific or technical personnel in the field, the specific meaning of the above terms in the present invention can be determined on a case-by-case basis and cannot be understood as a limitation of the present invention.

The present invention designs a model test apparatus for shield post-wall grouting and tube sheet uplift under high hydraulic pressure conditions, as shown in FIGS. 1, 7, 8, and 9, which mainly includes a main body box 1, a tension apparatus 46, a shield system, a grouting system, a ground stress loading system, a water injection system, and a monitoring system. Among them, the main body box 1 contains a removable front main board 101, a rear main board 105, and two side plates 102 on the left and right, and claimed front main board 101, the rear main board 105, and two side plates 102 are made of visual material. At the same time, processing in the side of the side plate 102, there are grid lines, so that the observer can see the relevant parts of the floating situation. There are the machined bolt holes I 103 and bolt holes II 104 in the front main board 101 and the rear main board 105 and the side plate 102 around the upper and lower end, for placing screws and bolts to put together the main box 1. The upper surface of the main box 1 is open, the interior of the main box 1 is used to fill the model soil 42, model soil 42 soil type according to the actual construction conditions. The front main board 101 of the main body box is machined with the shield shell hole 2, which is formulated according to the size needed for the shield shell of the shield start. A first interface 9 and bolt hole V 106 is opened on the rear main board 105 at the rear end of the main body box.

As shown in FIGS. 1 to 11, the shield shell system includes a shield shell 3, an adjustable pulley 4, a tube sheet 5, a cover plate 12, a first interface 13, a second interface 14, and a third interface 15. Wherein the shield shell 3 is composed of annular steel plate, the shield shell is located inside the main box 1, the front of the shield shell is placed in the shield shell hole 2 of the main board 101 in front of the main box, and the inner wall of the shield shell 3 is fixed with a plurality of adjustable pulleys 4 along the circumference. The number of tube sheets 5 is 5, and they are arranged sequentially in the shield shell 3 near the end of the shield, and the wheel surfaces of several adjustable pulleys support the outer wall of the tube sheets. The first and last ends of the adjacent tubes are restrained by screw connections. In the initial state, the shield tail end and the rearmost tube sheet of the shield shell fit the rear main plate 105, and the rearmost tube sheet is connected to the rear main plate 105 by bolts and nuts through bolt holes V 106 so that the rearmost tube sheet is temporarily restrained to the rear main plate 105, and so designed as to prevent the tube sheet from following the shield shell from lateral displacement the moment the shield shell 3 starts to move forward. A first interface 13, a second interface 14, and a third interface 15 are machined on the surface of cover 12. The third interface 15 is used to connect tension apparatus 46 to ensure that the shield shell 3 is dug forward under the action of tension apparatus 46.

Figure 6:
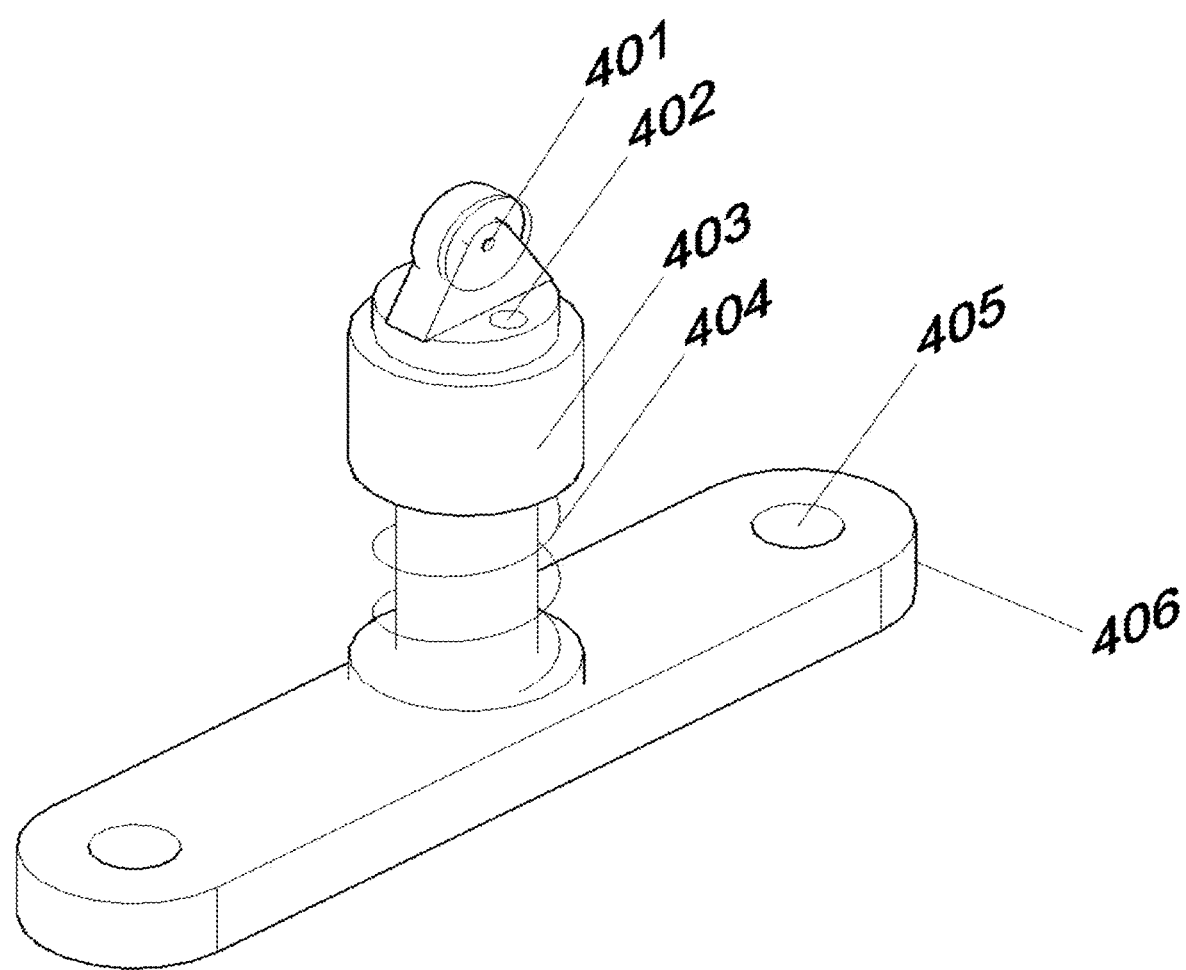
FIG. 6 shows the structural schematic diagram of the adjustable pulley provided by the present invention.
Figure 7:
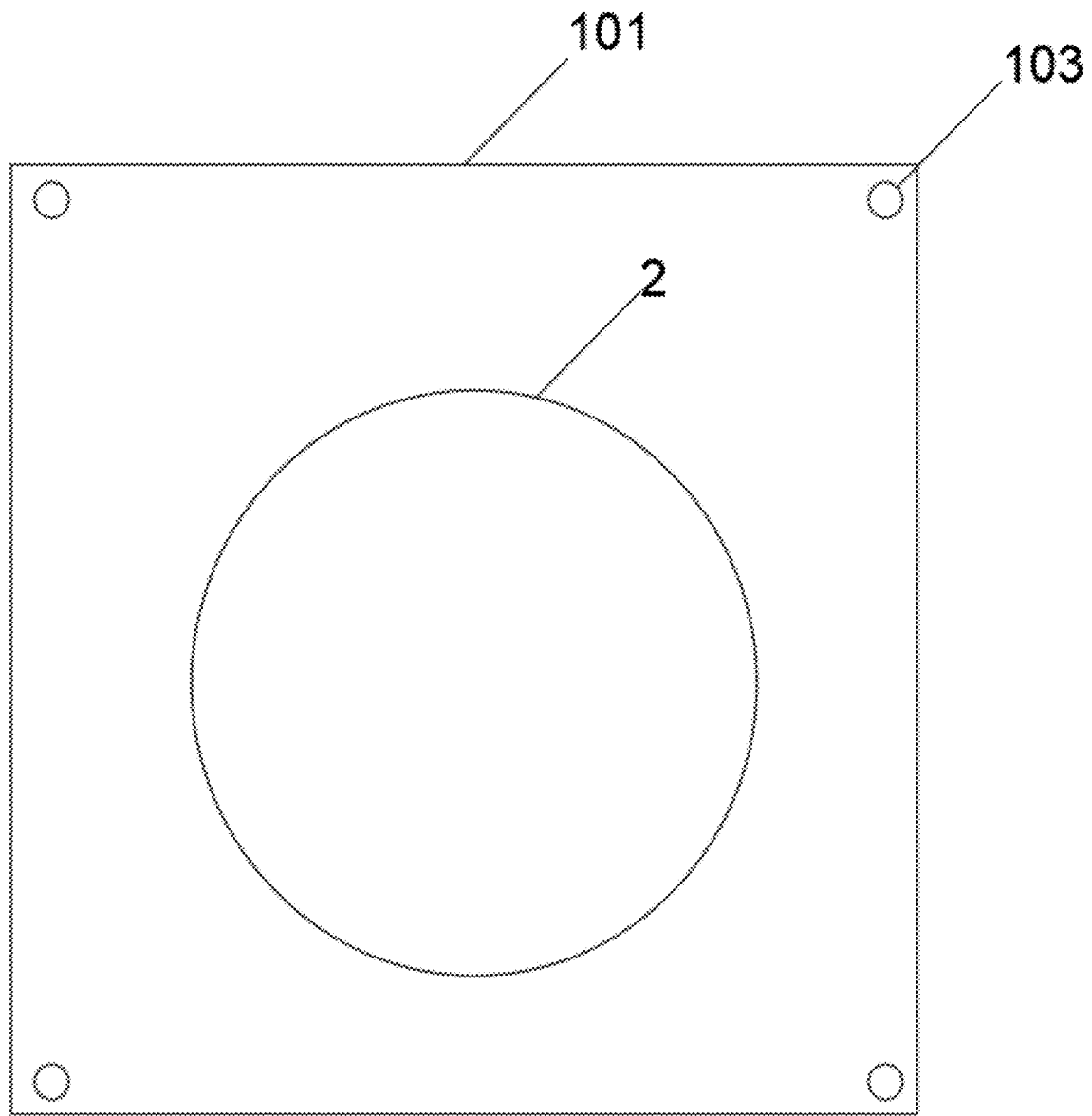
FIG. 7 shows the structural schematic diagram of the front main board of the main body box provided by the present invention.
Figure 8:
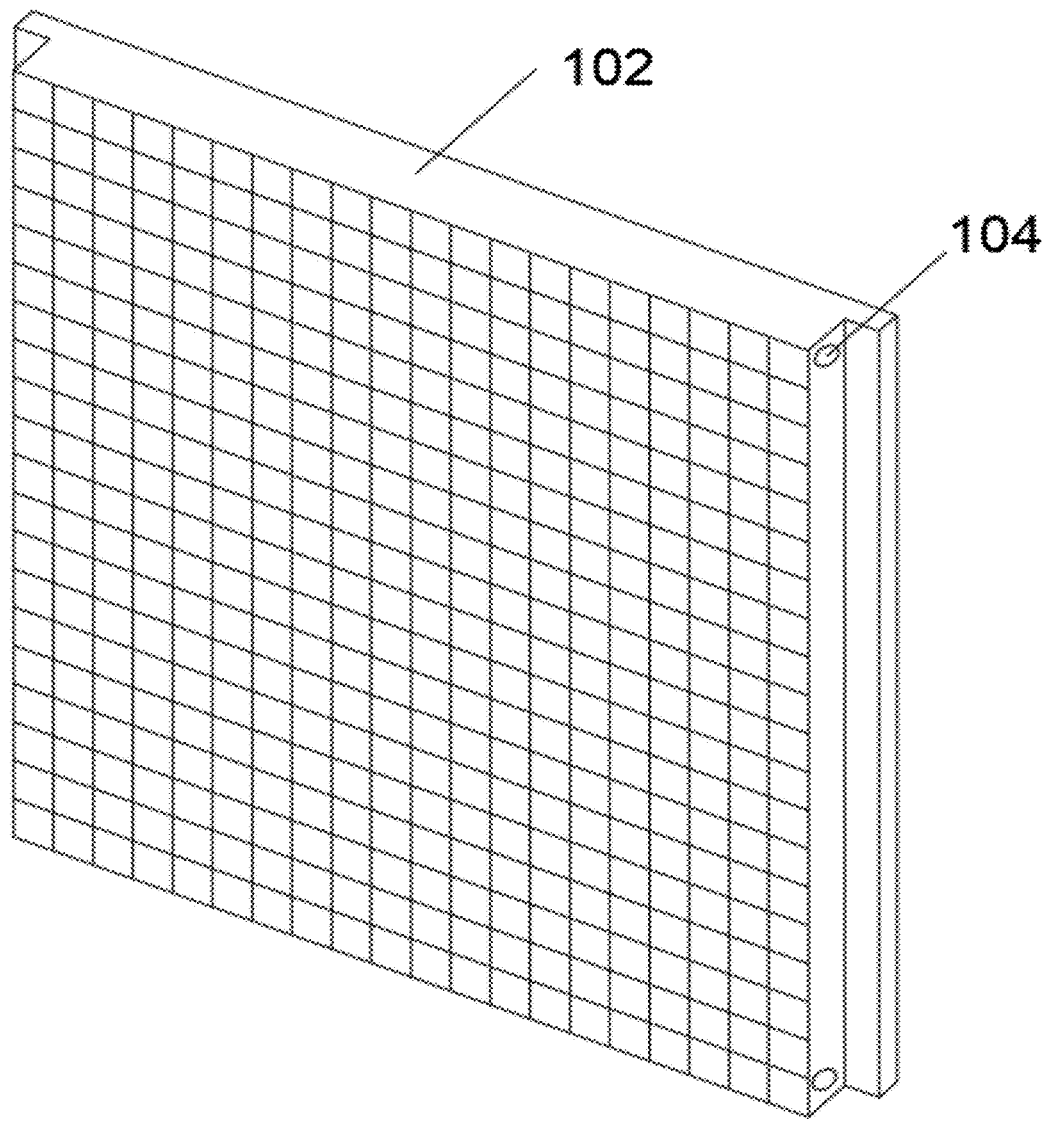
FIG. 8 shows the structural schematic of the side panel of the main body box provided by the present invention.
Figure 9:
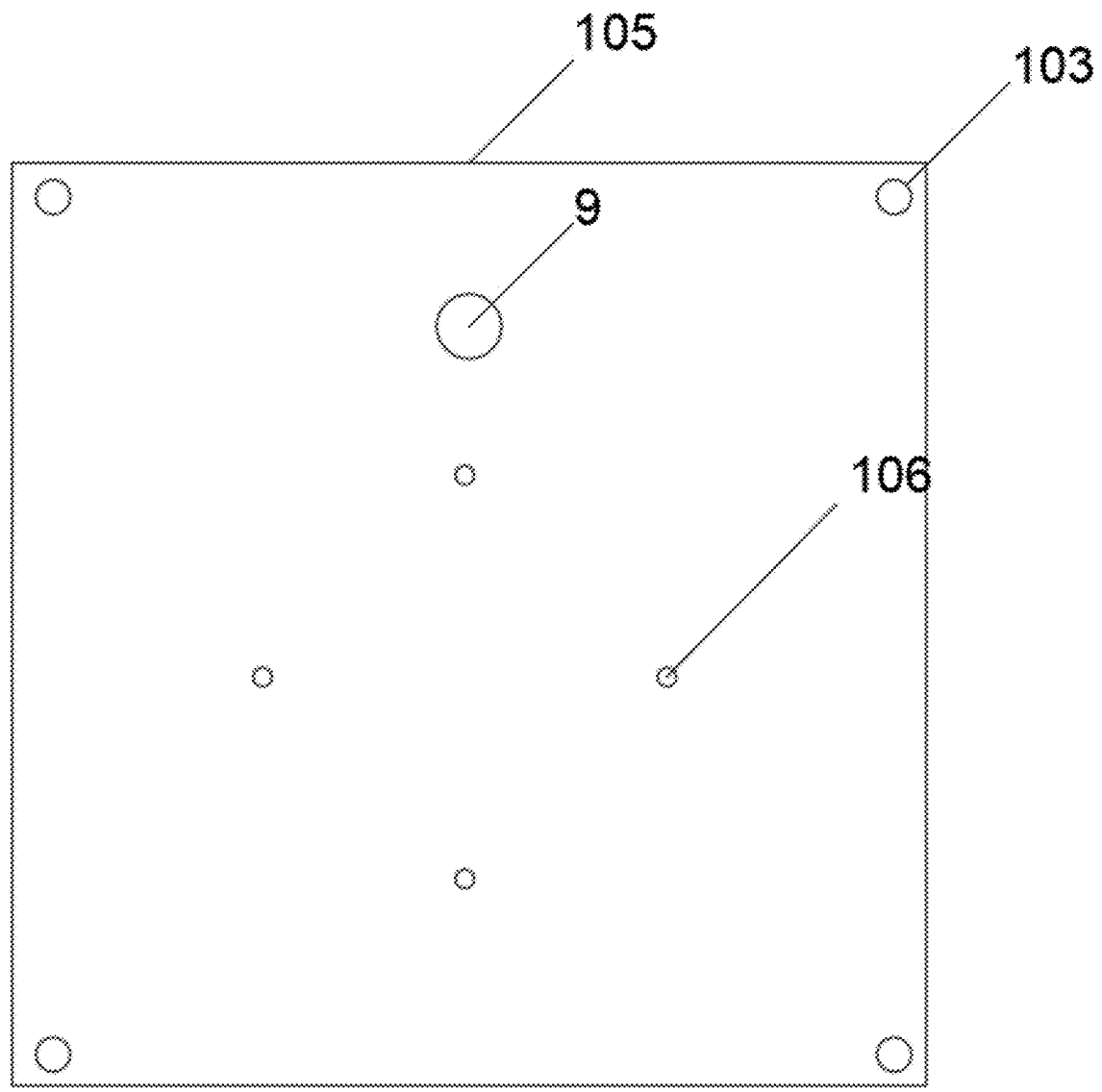
FIG. 9 shows the structural schematic of the rear main board of the main body box provided by the present invention.

As shown in FIG. 6, the adjustable pulley 4 consists of pulley 401, bolt cap 403, torsion strut 404, and chassis support 406, with bolt holes IV 405 on both sides of chassis support 406, which are used to connect the shield shell and chassis support by mating bolts. Torsion strut 404 is connected at the upper part of chassis support 406, and bolt cap 403 is threaded at the upper part of torsion strut 404, bolt hole III 402 is set around the top side of bolt cap 403, and the bolt cap 403 and pulley 1 are connected through bolts. On one hand, the distance between shell tube piece 5 and shield shell 3 is adjusted through adjusting the adjustable pulley 4 and the relative height of the bolt cap 403 at the twisting support 404. On the other hand, the adjustable pulley 4 around shield shell 3 is used to fix tube sheet 5 to prevent tube sheet 5 from tipping, moving, twisting, etc. due to the forward movement of shield shell 3.

As shown in FIGS. 1 to 5, the ground stress loading system includes loading plate 6, jack 7 and test frame 8. Test frame 8 has a gantry-type structure, the main box 1 is located in the doorway of the test frame 8, the test frame 8 is connected to jack 7 at the top, loading plate 7 is formulated according to the upper part rectangular size of the open mouth of main box 1, and it can be set into the model soil 42 inside the main box 1 to ensure that loading plate 6 and model soil 42 can contact with each other, it is used to bear the loading transferred from the jack 7 on the upper part of the loading plate 6 so that the loading is transferred uniformly to the model soil 42. Test frame 8 is made up of steel plate. There is a fourth interface 41 machined on the loading plate 6.

As shown in FIG. 1, the water injection system includes the first air compressor 16, air pipe 17, air pressure regulator I 18, water storage tank 19, water pressure gauge 20, valve I 21, water pipe 22, and water 38. The water storage tank 19 and the first air compressor 16 are connected through the air delivery I 17, where the air pressure regulator I 18 is installed. The fourth interface 41 and the water storage tank 19 are connected through the water pipe 22, the valve I 21 is installed on the water pipe 22, the water pressure gauge 20 is connected to the upper part of the water storage tank 19, it is used to monitor the water pressure in the water storage tank 19. The water 38 is stored in the water storage tank 18. The first air compressor 16 adjusts the pressure through the air pressure regulator 18 to transfer the gas to the water storage tank 18 to ensure that the water 38 enters the model soil 42 through the water pipe 22.

As shown in FIG. 1, the grouting system includes a second air compressor 23, a liquid storage tank I 24, a liquid storage tank II 25, a pressure regulator II 26, a pressure regulator III 27, a gas delivery pipe II 28, a valve II 29, a valve III 30, a double liquid mixer 31 and a liquid delivery pipe 32, a grouting recorder 35, a pressure gauge I 39, and a pressure gauge II 40. The second air compressor 23 is connected to the air inlet of liquid storage tank I 24 and liquid storage tank II 25 respectively through air supply pipe II 28, and the air pressure regulator II 26 and air pressure regulator III 27 are installed on the air supply pipe II 28 near the air inlet of liquid storage tank I 24 and liquid storage tank II 25 respectively. Pressure gauges I 39 and II 40 are installed on liquid storage tank I 24 and liquid storage tank II 25, the first grout 36 and the second grout 37 are stored in storage tank I 24 and storage tank II 25, respectively. The liquid outlet of storage tank I 24 and storage tank II 25 are connected to liquid delivery pipe 32, valve II 29, valve III 30, double-liquid mixer 31, and slurry recorder 35 are installed on liquid delivery pipe 32, valve II 29 and valve III are connected to the liquid outlet of storage tank I 24 and storage tank II 25 respectively, the double-liquid mixer 31 makes the first slurry 36 and second slurry 37 stirred and mixed fully. The end of the liquid delivery tube 32 is divided into two branches and they are connected to the shield shell through the first interface 13 and 14 respectively. The inner wall of the rear end of the shield shell 3 is provided with an annular barrier plate 34, which can prevent the slurry from flowing into the shield shell 3 so that the injection slurry can flow in the gap between the model soil 42 and the pipe sheet 5 better. The plate surface of barrier plate 34 is provided with a plurality of slurry injection ports 33 along the circumferential direction, each slurry injection port 33 is connected with a slurry tube correspondingly, all the slurry tubes are fixed transversely in the gap between the shield shell and the pipe sheet, and the slurry inlet ports of all the slurry tubes are connected to the liquid delivery tube 32. The second air compressor 23 applies pressure to the liquid storage tank I 24 and the liquid storage tank II 25 through the air pressure regulator II 26 and the air pressure regulator III 27 respectively. Open valve II 29 and valve III 30 to make the first slurry 36 and the second slurry 37 produce a double-liquid slurry through the double-liquid mixer 31, and the double-liquid slurry is transported to the slurry injection port 33 through the liquid delivery pipe 32 to fill the gap between the model soil and the pipe sheet 5. In this embodiment, the water injection pressure in the water injection system should be ensured at 0.5-1.0 MPa. High water pressure is applied to the soft strata to form a mud-water environment to simulate the shield post-wall slurry filling process under the high pressure mud-water environment.

Figure 12:
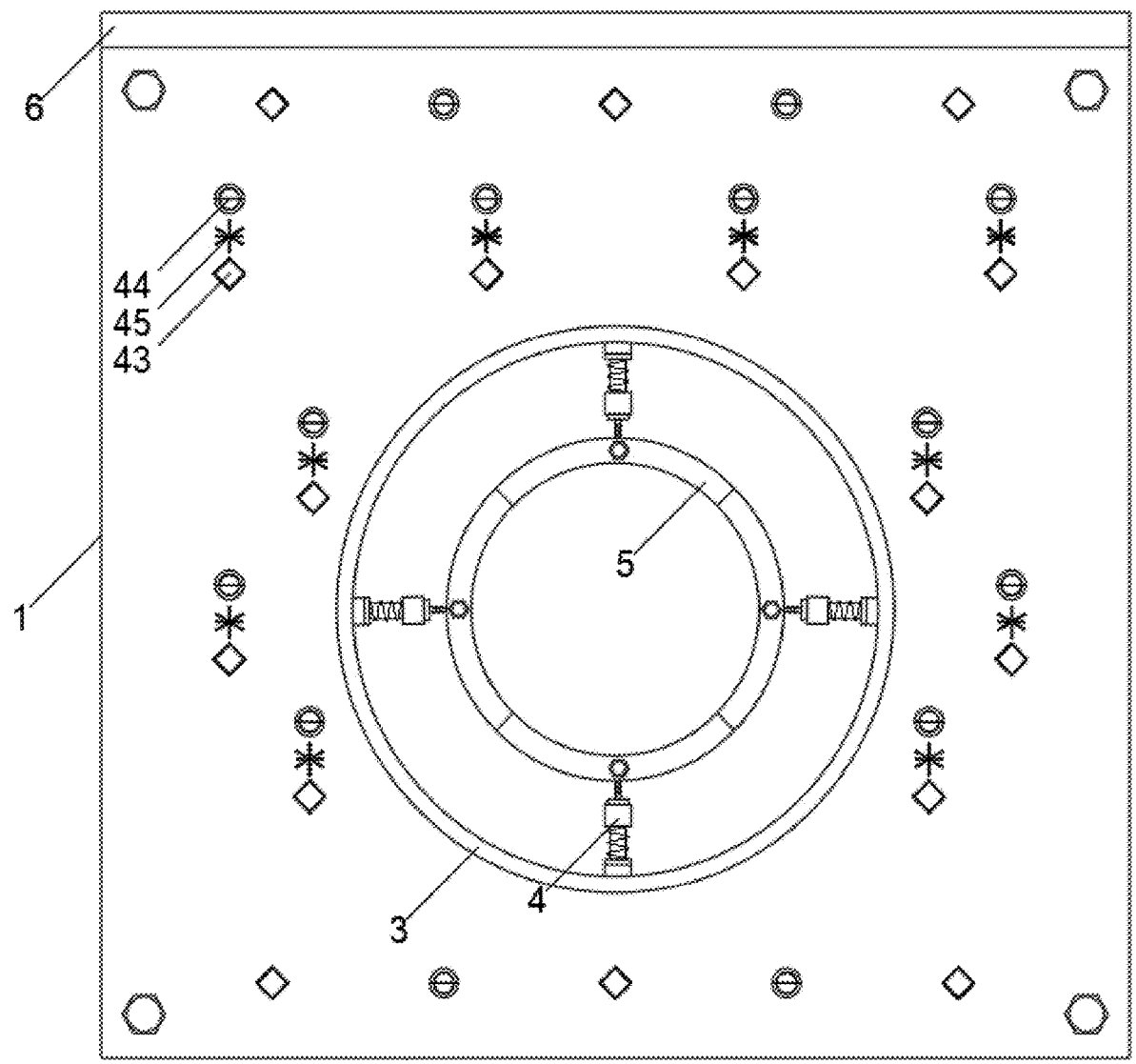
FIG. 12 shows the monitoring system arrangement in the A-A section provided by the present invention.
Figure 13:
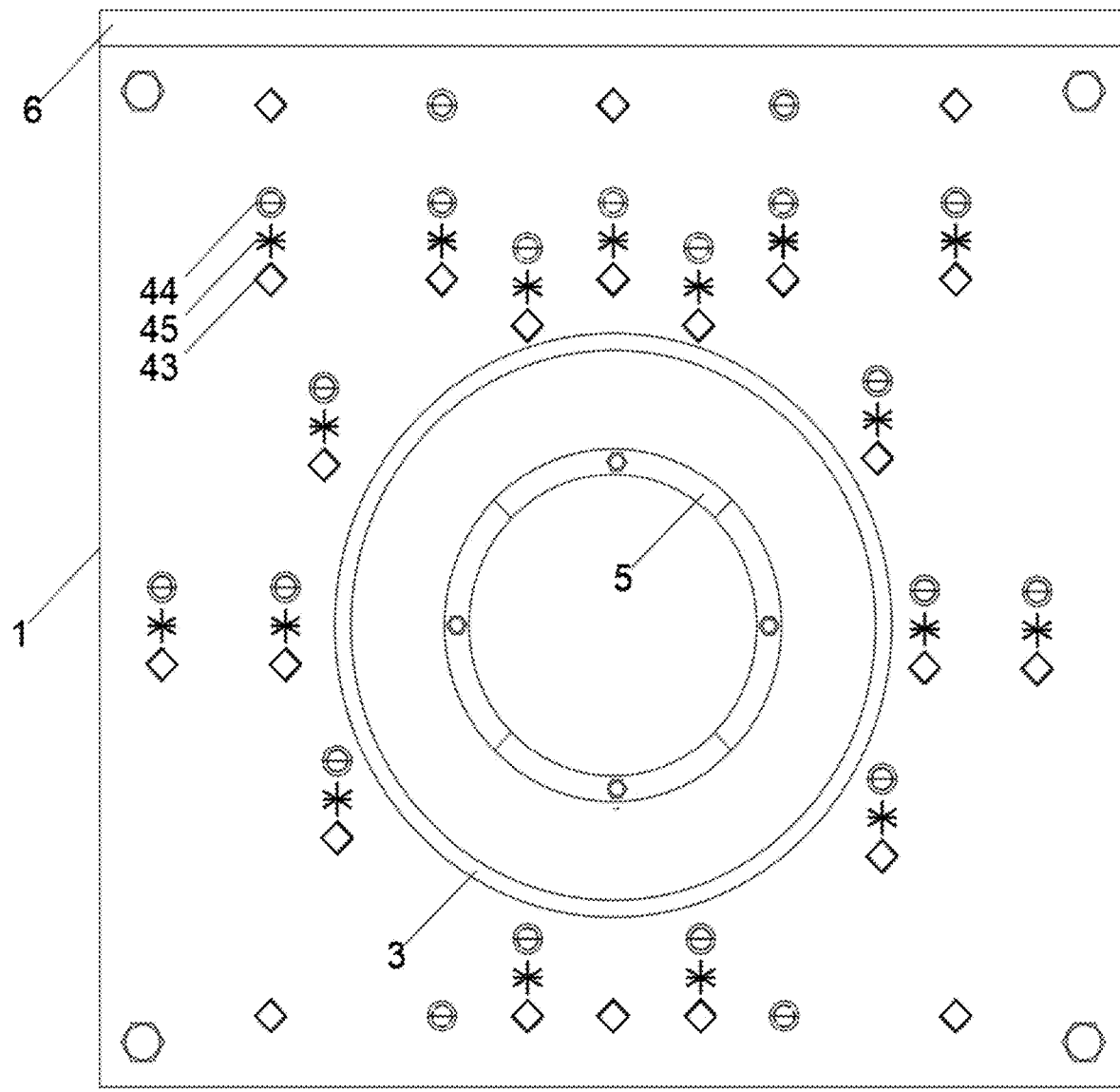
FIG. 13 shows the monitoring system arrangement in the B-B section provided by the present invention.

As shown in FIGS. 1, 12, and 13, the monitoring system includes monitoring elements, the signal line 10, and the data acquisition processor 11. The monitoring elements include displacement sensor 43, soil pressure sensor 44, and dynamic water pressure sensor 45. Soil pressure sensor 44 and dynamic water pressure sensor 45 are used to detect the changes of stress and seepage pressure inside the soil body of the model soil during the test, respectively, and the displacement sensor 43 is used to detect the uplift of the pipe sheet during the test. The displacement sensor 43, the soil pressure sensor 44, and the dynamic water pressure sensor 45 are connected to the signal line 10, which is connected to the data acquisition processor 11 through the first interface 9.

Figure 2:
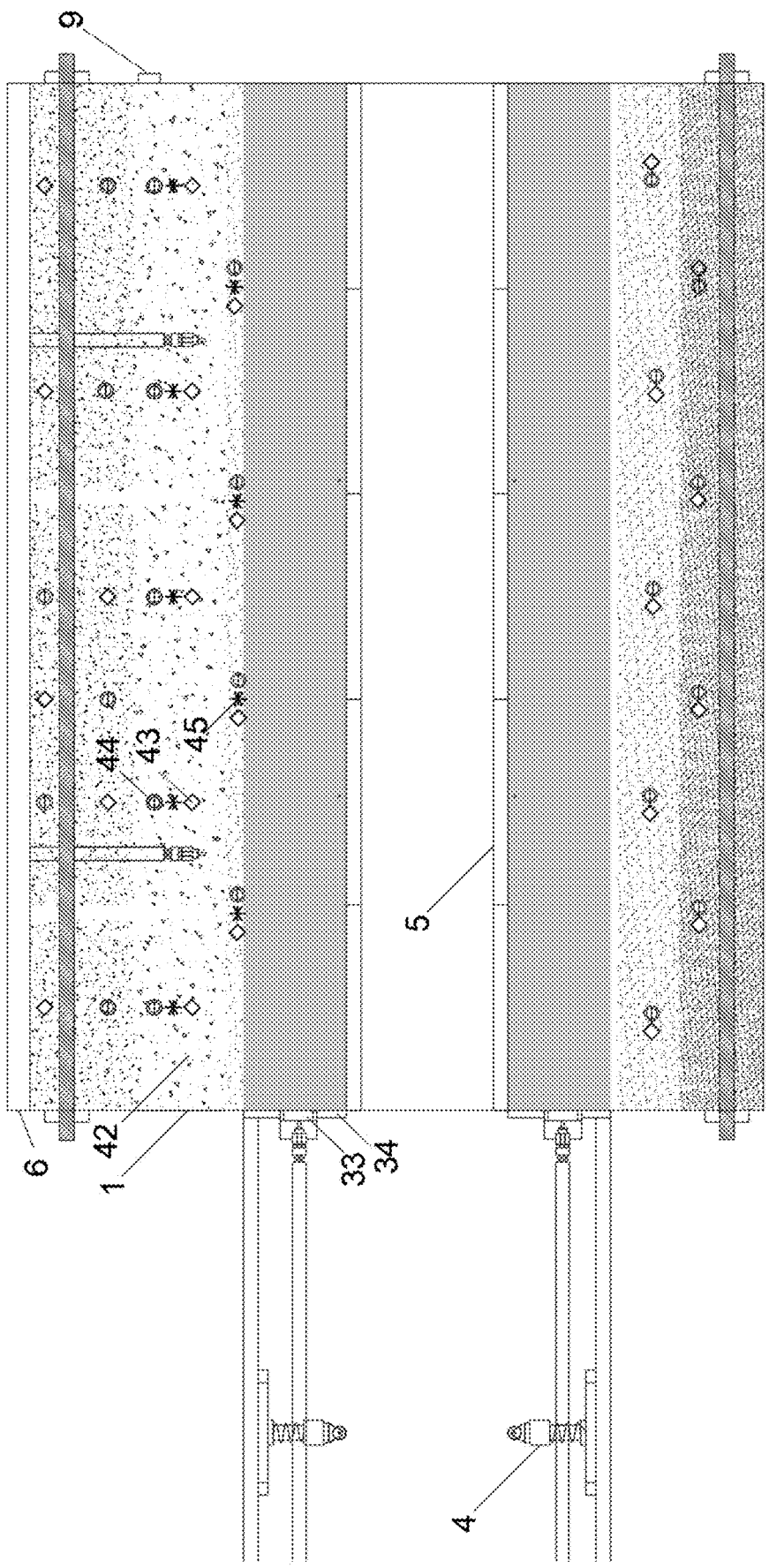
FIG. 2 shows the schematic plan view of the test apparatus after shield grouting provided by the present invention at the end.
Figure 3:
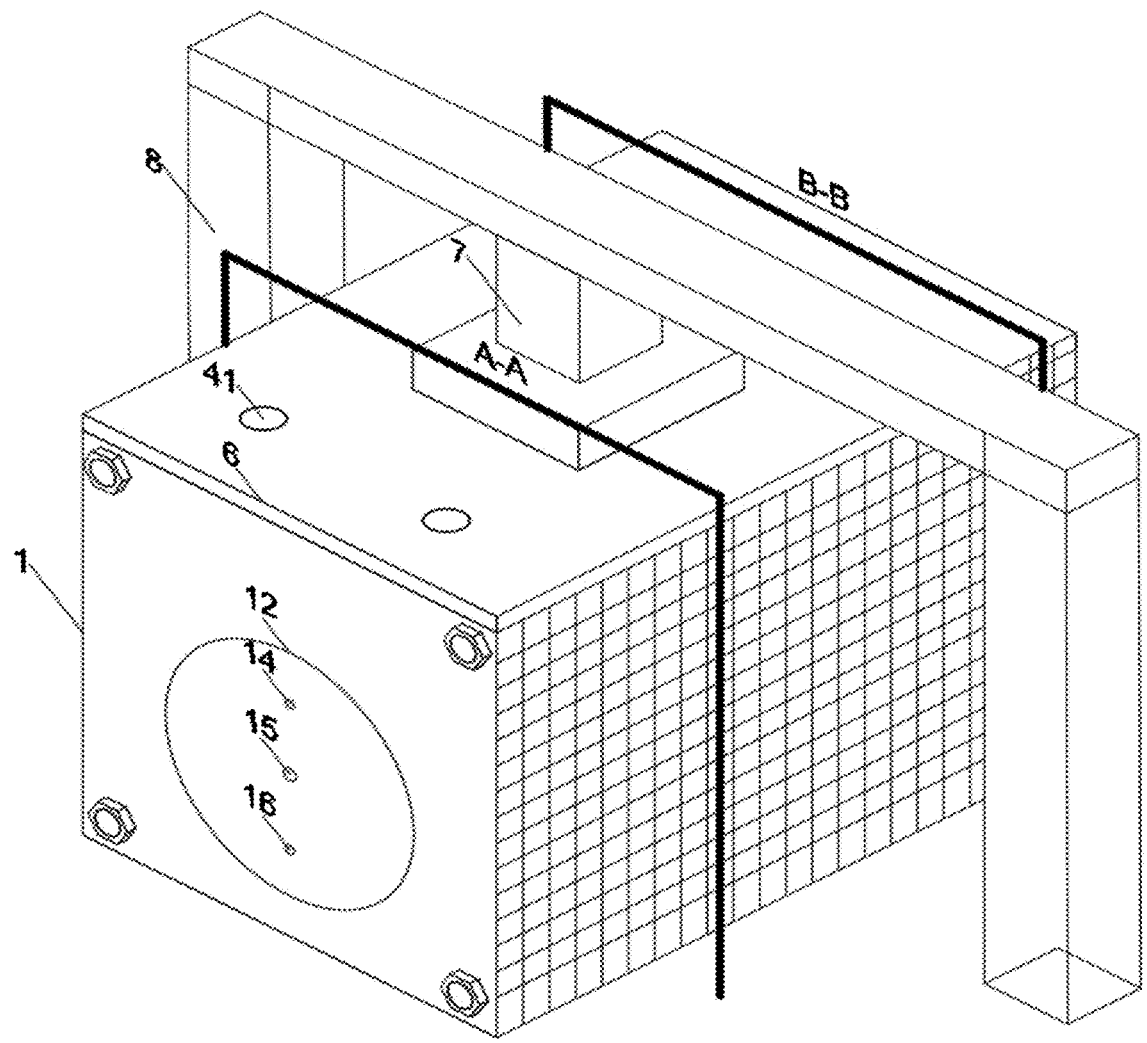
FIG. 3 shows the elevation view of the main body box and the ground stress loading system provided by the present invention.
Figure 4:
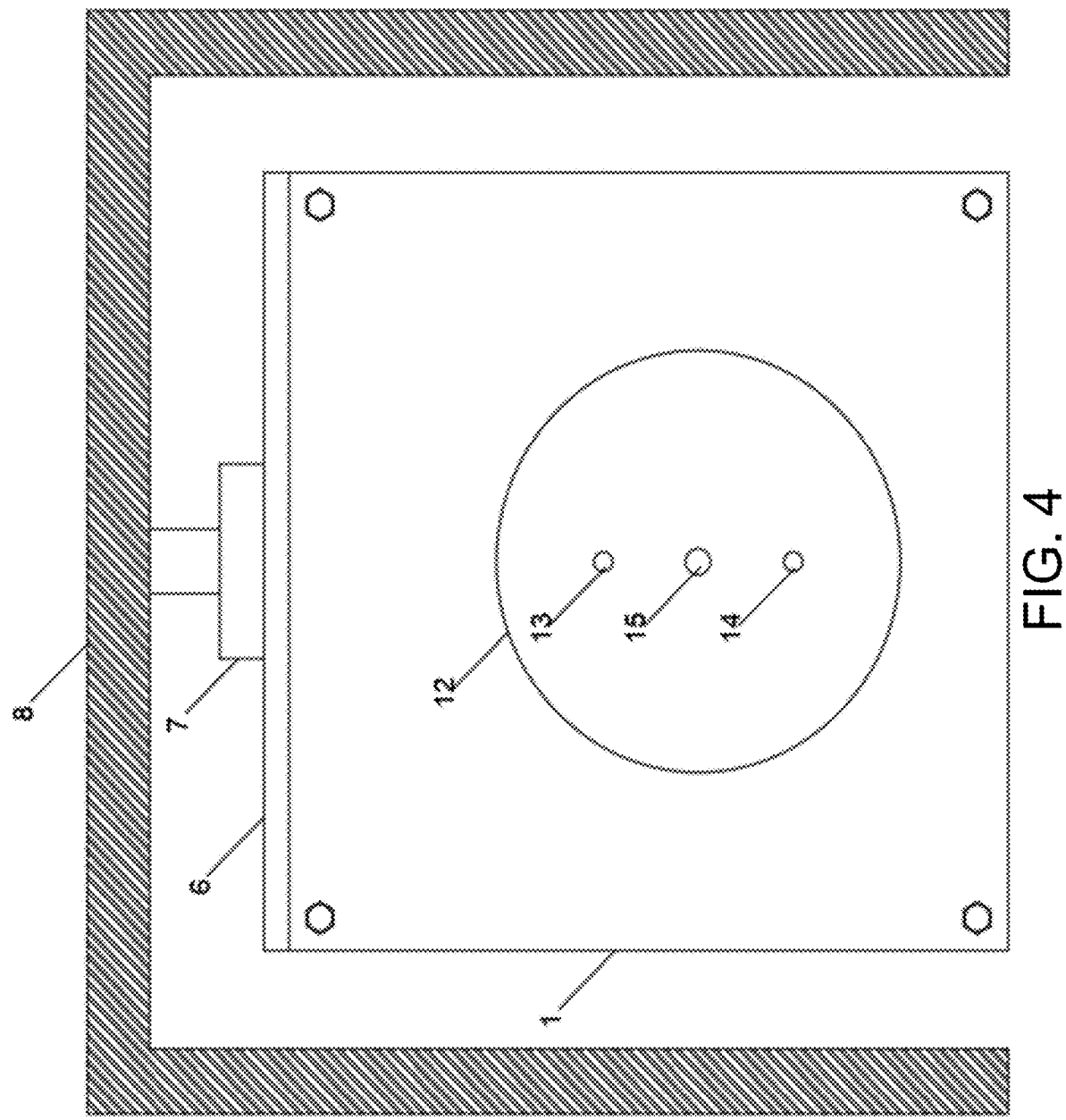
FIG. 4 shows the front view of the main body box and the ground stress loading system provided by the present invention.
Figure 5:
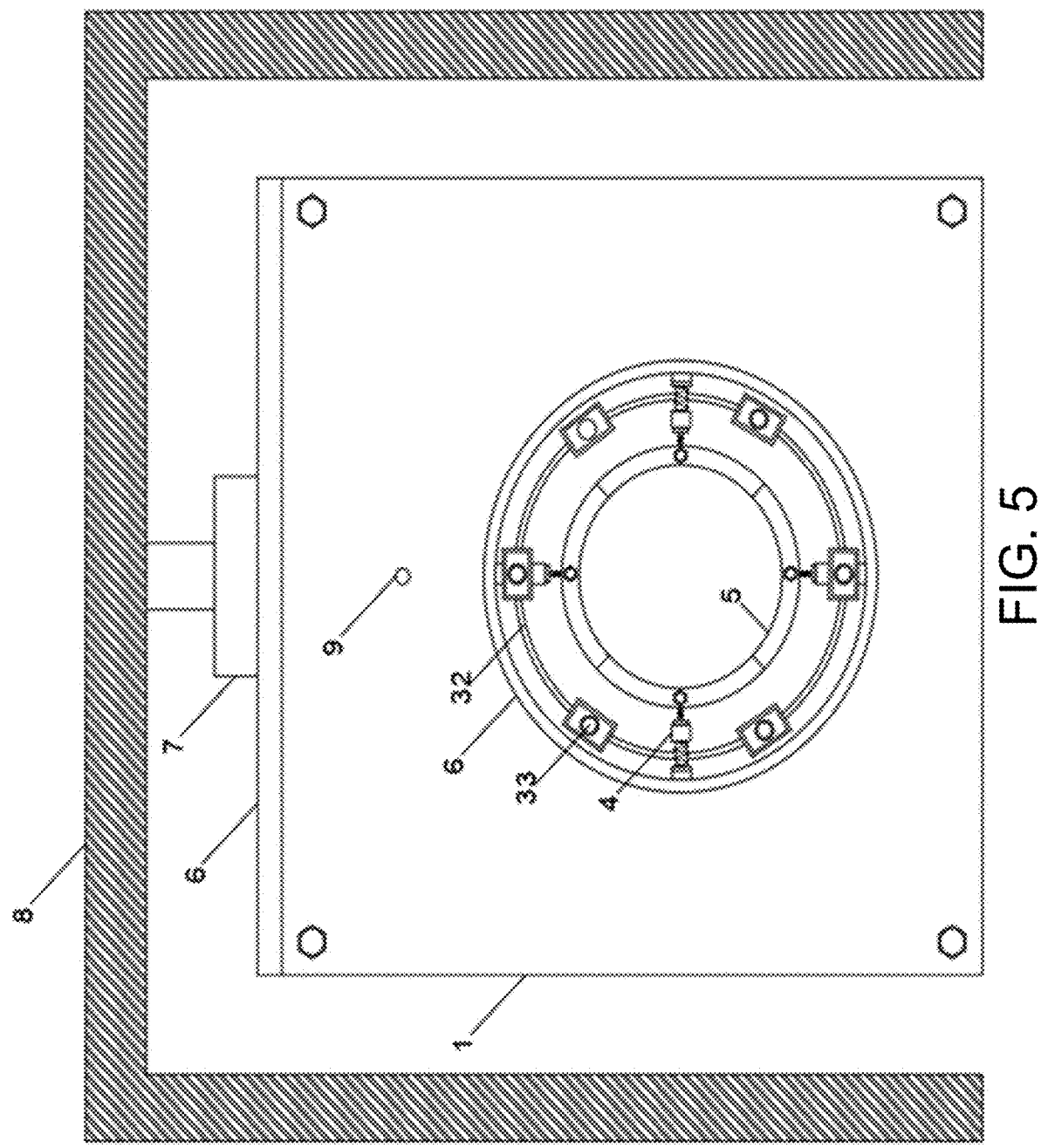
FIG. 5 shows the rear view of the main body box and the ground stress loading system provided by the present invention.

As shown in FIGS. 1 to 3, tension apparatus 46 is connected to cover 12 through the third interface 15 in cover 12, and in this embodiment, the tension apparatus is a hydraulic cylinder. Wherein the tension apparatus 46 carries forward the shield shell 3 to make the boring horizontal movement, and in the process of moving forward, the grouting has been performed in the system, and the slurry reaches the grouting port 33 through the delivery tube 32 to fill the gap between the model soil and the pipe sheet 5 until the shield shell boring is completed. The completion situation of shield shell boring and grouting is shown in FIG. 2.

Figure 10:
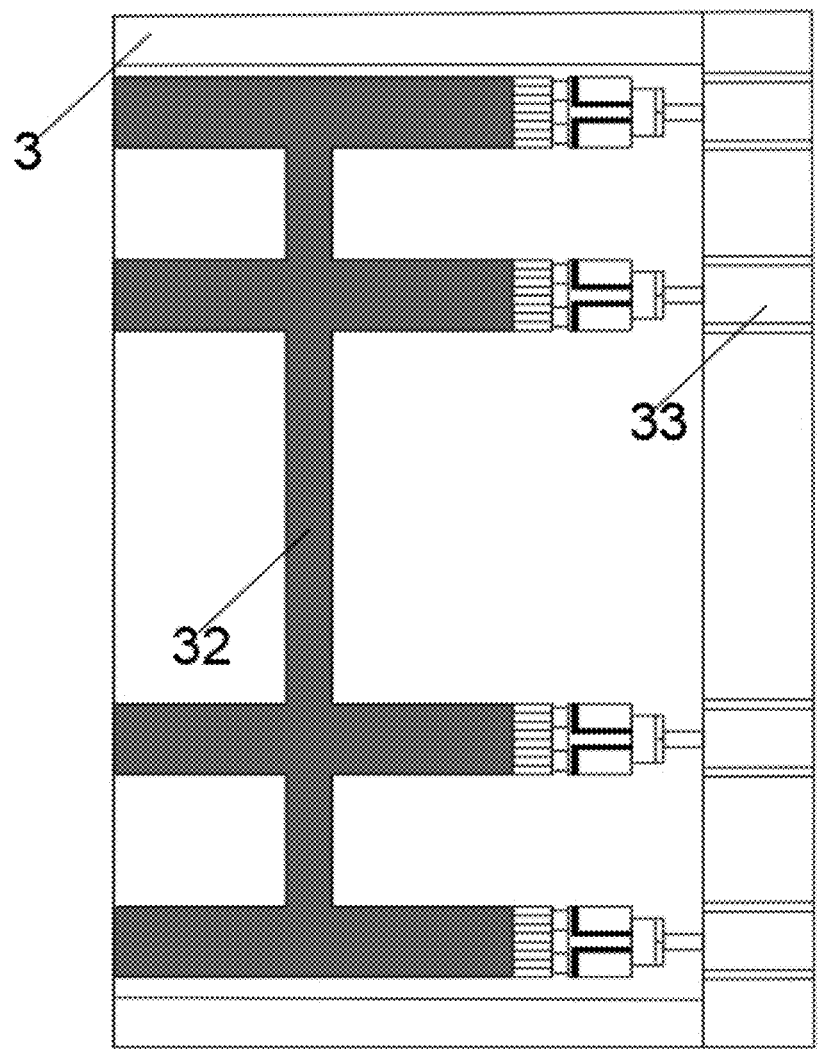
FIG. 10 shows the side view of the injection tube and grouting tube provided by the present invention.
Figure 11:
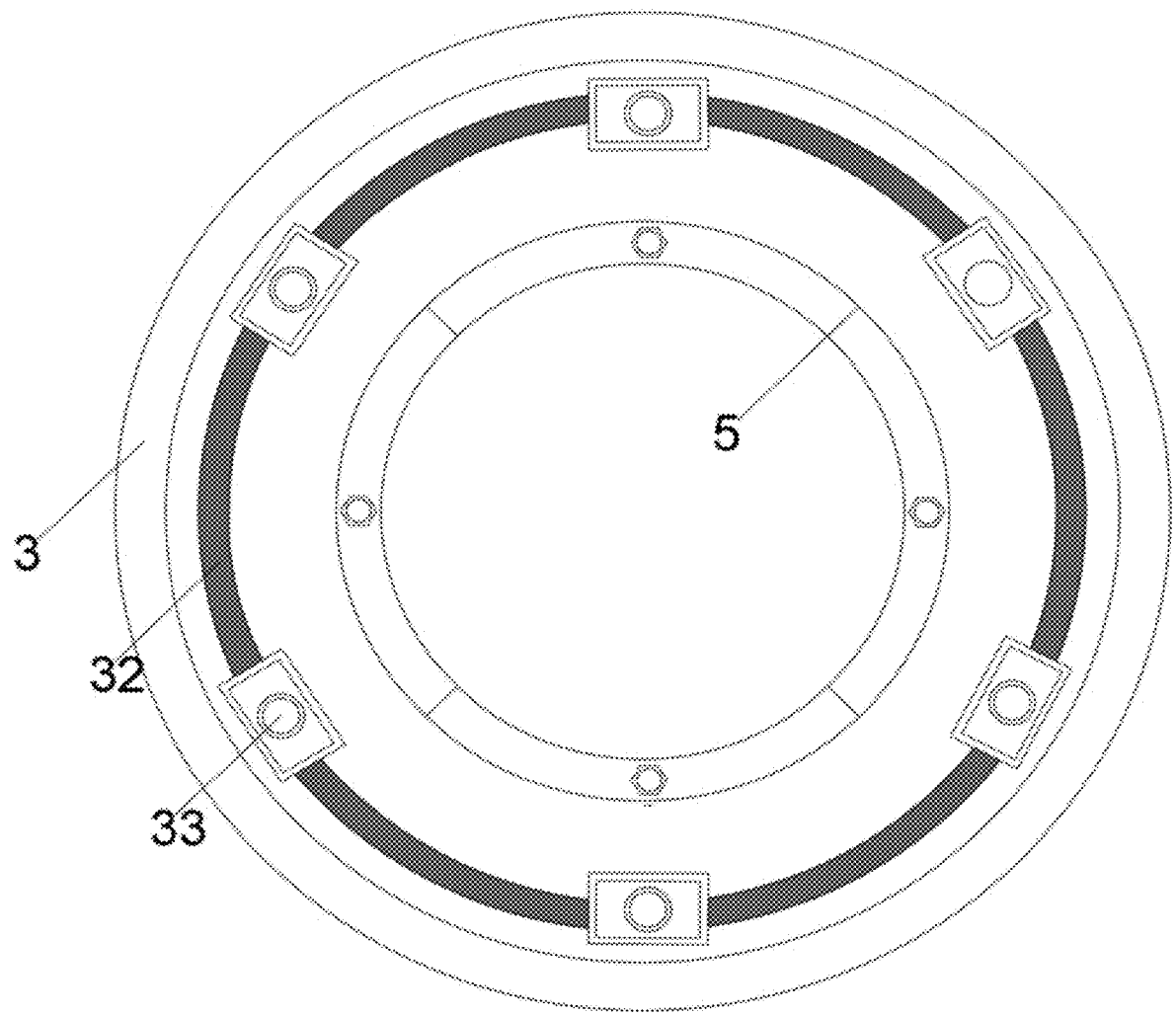
FIG. 11 shows the rear view of the injection tube and grouting port provided by the present invention.

As shown in FIGS. 10 and 11, this embodiment adopts a six-point synchronous grouting point position at the end of the shield, i.e., six grouting ports 33 are distributed in a circular array on the barrier 34, surrounding a circle so that the slurry from the delivery tube 32 is delivered uniformly to the six grouting ports 33 to ensure that the slurry can fill the gap between the shield shell 3 and the model soil.

In this embodiment, the monitoring elements are distributed in two forms, as shown in FIG. 12, one type is that the monitoring elements distribute in the middle position of each ring of pipe pieces in model soil. The other type is that the monitoring elements are distributed in the location of the adjacent pipe pieces in the model soil, as shown in FIG. 13. It can be understood that in FIGS. 12 and 13, the infusion tube 32 is not drawn, but it does not mean that the infusion tube 32 is missing, it only to describe the distribution of the present monitoring elements better. In other embodiments, the location and number of monitoring elements to be laid out should be selected with the actual simulation needs.

In this embodiment, the model soil is divided into four layers, the model soil is silty powdery clay and powdery clay in the upper part of the shield shell, the model soil is medium coarse sand in the lower part of the shield shell, and the model soil for shield tunneling is powdery fine sand. It should be noted that in other embodiments, the type of model soil should be adjusted according to the specific actual working conditions. The type of model soil can be limestone, mudstone, siltstone, quartz sandstone, etc., or it can be a clay stratum such as chalk, silt, chalky clay, medium coarse sand, gravelly sand, medium sand, chalky fine sand, silty chalky, etc.

The selected model soil parameters are as follows.

| Soil layer name | Severe (KN/m³) | Water content (%) | Void ratio (e) | Cohesion (KPa) | Internal friction angle (°) |
| --- | --- | --- | --- | --- | --- |
| Muddy silty clay | 17.7 | 45 | 1.31 | 14.3 | 11.7 |
| Silty Clay | 17.2 | 40.1 | 1.23 | 7.4 | 14.8 |
| Powder fine sand | 18.7 | 27.4 | 0.8 | 0 | 29 |
| Medium-coarse Sand | 15.4 | 32.2 | 0.65 | 0 | 31 |

The present invention also provides a model test method for shield post-wall grouting and tube sheet uplift under high water pressure condition, the steps are described as follows.

Step 1: Install the main body box and the ground stress loading system.

Step 2: Install the shield system, adjusting pulley 4 to the designated position of shield shell, embed a plurality of pipe pieces into the rear position of the shield shell, adjust the distance between the shield shell 3 and the tube sheet 5 by the adjustable pulley 4. After the adjustment, connect the slurry delivery pipe with the slurry injection port 33 of barrier plate 34. Embed the shield shell 3 at the main box shield shell hole 2. Bolt the rearmost tube piece to the rear main board of the main box. Install cover plate 12 to the front end of shield shell 3, and the third interface is connected to tension apparatus 46.

Step 3: Install the grouting system, and connect the liquid delivery pipe 32 to the liquid storage tanks I 24 and II 25. The liquid storage tank I 24 and liquid storage tank II 25 are connected to the second air compressor 23 through the air delivery pipe II 28. Further, the air pressure regulators II 26 and III 27 are installed on the air delivery pipe II 28. The valve II 29, valve III 30, the double liquid mixer 31, and the grouting recorder 35 are installed on the liquid delivery pipe 32. The first interface 13 and the second interface 14 of the cover plate 12 are connected to every slurry tube.

Step 4: Install the water injection system, connect the air delivery pipe I 17 and the water storage tank 19 with the first air compressor 16, install the air pressure regulator 18 on the air delivery pipe I 17, connect the water delivery pipe 22 with the fourth interface 41 and the water storage tank 19, and install the valve I 21 on the water delivery pipe 22.

Step 5: Fill the model soil 42 into the main box 1, and bury the displacement sensor 43, soil pressure sensor 44, and dynamic water pressure sensor 45 in the model soil 42. The signal lines 10 of the displacement sensor 43, soil pressure sensor 44, and dynamic water pressure sensor are drawn to the third interface 15 to connect to the data acquisition processor 11. and install loading plate 6 in the upper part of the model soil 42.

Step 6: Apply water pressure and open valve I 21. The first air compressor 16 pressurizes the water storage tank 19 to make water enter the model soil 42 through the delivery pipe to the fourth interface 41. When the specified pressure reaches, close valve I 21 and stop the water injection.

Step 7: Apply ground stress. Turn on jack 7 and press the load downward. Pass the load through the loading plate 6 to transfer the load evenly in the model soil 42, and stop the loading after reaching the desired environmental ground stress.

Step 8: Start the tension apparatus 46 to move shield shell 3 outward for horizontal digging movement, while shield shell 3 is moving, open the valve II 29 and valve III 30, and the second air compressor 23 applies pressure to the reservoir I 24 and reservoir II 25 to make the first slurry 36 and the second slurry 37 generate the double liquid slurry through the double liquid mixer 31, the double liquid slurry reaches the slurry injection port 33 through the liquid delivery pipe 32 and grouting is performed to the gap between the model soil and the pipe sheet 5. When advancing one ring, the bolt in bolt hole V 106 is removed to release the constraint between the rearmost tube sheet and the rear main board of the main box.

Step 9: After grouting, collect data, summarize the tube sheet uplift pattern and the diffusion reinforcement pattern of tube sheet grouting in different rings, and evaluate the effects of shield post-wall synchronous grouting.

Step 10: Repeat steps one to nine above and set different parameters such as ground stress pressure, water pressure, slurry type, grouting volume, grouting pressure, gap between shield shell 3 and pipe sheet 5, and shield boring speed, etc. Complete the shield post-wall synchronous grouting tests under different conditions.

What is claimed is:

1. A model test apparatus for shield post-wall grouting and tube sheet uplift under high water pressure conditions, comprising: a main body box, a tension apparatus, a shield system, a grouting system, a ground stress loading system, a water injection system, and a monitoring system, wherein an upper face of the main body box is open, the main body box is made up of a visual material, a front face of the main body box is equipped with a shield shell aperture, wherein the shield system includes a shield shell and multiple pipe sheets, the shield shell is located in the main body box, a front part of the shield shell is located in the shield shell aperture, and tube pieces are located inside the shield shell in sequence, wherein the main box is filled with model soil, a loading plate is located at an open position of the main box, the ground stress loading system achieves ground stress loading simulation to the model soil through the loading plate, the water injection system connects to the model soil which is located above the shield shell in the main box through a water pipeline, and a high water pressure mud and a water environment has been simulated, wherein the tension apparatus connects to the front part of the shield shell, a slurry delivery tube of the grouting system is installed within the shield shell, while the shield shell is moving outward in a horizontal boring motion by the tension apparatus, the grouting system injects slurry into a gap between the pipe sheet and the model soil through the slurry delivery pipe, wherein the monitoring system is used to monitor and collect relevant test parameters of the model soil in the main box, the shield shell is made up of annular steel plate, an inner wall of the shield shell is fixed with several adjustable pulleys along a circumferential direction, wheel surfaces of several adjustable pulleys support an outer wall of the pipe sheet, wherein the pipe sheet is composed of splicing ring-shaped structure, adjacent pipe sheets are connected with each other by bolts, the front part of the shield shell is equipped with a cover plate, and a third interface is provided on the cover plate and connects with the tension apparatus.

2. A model test method for shield post-wall grouting and tube sheet uplift under high water pressure conditions, wherein a test is carried out using a model test apparatus for shield post-wall grouting and tube sheet uplift under high water pressure conditions according to claim 1, comprising the following steps:

step 1: install the main body box and the ground stress loading system, step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell, step 3: install the grouting system, step 4: install the water injection system, step 5: fill the main body box with the model soil, burying the displacement sensor, the soil pressure sensor, and a dynamic water pressure sensor in the model soil, and install the loading plate in an upper part of the model soil, the loading plate connects to the ground stress loading system, step 6: apply water pressure, the water injection system injects water into the model soil through the water pipeline, step 7: apply ground stress, the ground stress loading system makes a load transfer evenly in the model soil through the loading plate, stop loading after the ground stress reaches a desired stress value of the water environment, step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box, step 9: after the grouting is finished, collect data through the monitoring system, summarize a pipe piece uplift law and a grouting diffusion reinforcement pattern of the pipe piece in different rings, and evaluate an effect of shield post-wall synchronous grouting, step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

3. The model test apparatus according to claim 1, wherein the main body box comprises a detachable front and rear main boards, a left-side panel, a right-side panel, and the left-side panel and the right-side panel are each provided with grid lines on the panels.

4. A model test method for shield post-wall grouting and tube sheet uplift under high water pressure conditions, wherein a test is carried out using a model test apparatus for shield post-wall grouting and tube sheet uplift under high water pressure conditions according to claim 3, comprising the following steps:

step 1: install the main body box and the ground stress loading system, step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell, step 3: install the grouting system, step 4: install the water injection system, step 5: fill the main body box with the model soil, burying the displacement sensor, the soil pressure sensor, and a dynamic water pressure sensor in the model soil, and install the loading plate in an upper part of the model soil, the loading plate connects to the ground stress loading system, step 6: apply water pressure, the water injection system injects water into the model soil through the water pipeline, step 7: apply ground stress, the ground stress loading system makes a load transfer evenly in the model soil through the loading plate, stop loading after the ground stress reaches a desired stress value of the water environment, step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box, step 9: after the grouting is finished, collect data through the monitoring system, summarize a pipe piece uplift law and a grouting diffusion reinforcement pattern of the pipe piece in different rings, and evaluate an effect of shield post-wall synchronous grouting, step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

5. The model test apparatus according to claim 1, wherein the water injection system comprises a first air compressor, an air delivery pipe I, an air pressure regulator I, a water storage tank, a water pressure gauge, and a water delivery pipe, the water storage tank and the first air compressor are connected through the air delivery pipe I, the air pressure regulator I is installed on the air delivery pipe I, an outlet of water storage tank connects to the water pipeline, the delivery pipe is inserted into the model soil after penetrating through the loading plate, the delivery pipe is installed with a valve I, and a water pressure gauge connects to an upper part of the water storage tank.

6. The model test apparatus according to claim 5, wherein the main body box comprises a detachable front and rear main boards, a left-side panel, a right-side panel, and the left-side panel and the right-side panel are each provided with grid lines on the panels.

7. A model test method for shield post-wall grouting and tube sheet uplift under high water pressure conditions, wherein a test is carried out using a model test apparatus for shield post-wall grouting and tube sheet uplift under high water pressure conditions according to claim 5, comprising the following steps:
   step 1: install the main body box and the ground stress loading system,
   step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell,
   step 3: install the grouting system,
   step 4: install the water injection system,
   step 5: fill the main body box with the model soil, burying the displacement sensor, the soil pressure sensor, and a dynamic water pressure sensor in the model soil, and install the loading plate in an upper part of the model soil, the loading plate connects to the ground stress loading system,
   step 6: apply water pressure, the water injection system injects water into the model soil through the water pipeline,
   step 7: apply ground stress, the ground stress loading system makes a load transfer evenly in the model soil through the loading plate, stop loading after the ground stress reaches a desired stress value of the water environment,
   step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box,
   step 9: after the grouting is finished, collect data through the monitoring system, summarize a pipe piece uplift law and a grouting diffusion reinforcement pattern of the pipe piece in different rings, and evaluate an effect of shield post-wall synchronous grouting,
   step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

8. The model test apparatus according to claim 1, wherein the ground stress loading system comprises a jack and a test frame, the test frame is a gantry type structure, the main body box is located in a doorway of the test frame, the jack connects to a top of test frame, and the loading plate connects to a loading part of the jack.

9. The model test apparatus according to claim 8, wherein the main body box comprises a detachable front and rear main boards, a left-side panel, a right-side panel, and the left-side panel and the right-side panel are each provided with grid lines on the panels.

10. A model test method for shield post-wall grouting and tube sheet uplift under high water pressure conditions, wherein a test is carried out using a model test apparatus for shield post-wall grouting and tube sheet uplift under high water pressure conditions according to claim 8, comprising the following steps:
   step 1: install the main body box and the ground stress loading system,
   step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell,
   step 3: install the grouting system,
   step 4: install the water injection system,
   step 5: fill the main body box with the model soil, burying the displacement sensor, the soil pressure sensor, and a dynamic water pressure sensor in the model soil, and install the loading plate in an upper part of the model soil, the loading plate connects to the ground stress loading system,
   step 6: apply water pressure, the water injection system injects water into the model soil through the water pipeline,
   step 7: apply ground stress, the ground stress loading system makes a load transfer evenly in the model soil through the loading plate, stop loading after the ground stress reaches a desired stress value of the water environment,
   step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box,
   step 9: after the grouting is finished, collect data through the monitoring system, summarize a pipe piece uplift law and a grouting diffusion reinforcement pattern of the pipe piece in different rings, and evaluate an effect of shield post-wall synchronous grouting,
   step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

11. The model test apparatus according to claim 1, wherein the monitoring system comprises a monitoring element, a signal line, and a data acquisition processor, the monitoring element comprises a displacement sensor, a soil pressure sensor, and a dynamic water pressure sensor, the monitoring element is placed within the model soil, and the monitoring element connects to the data acquisition processor via the signal line.

12. The model test apparatus according to claim 11, wherein the main body box comprises a detachable front and rear main boards, a left-side panel, a right-side panel, and the left-side panel and the right-side panel are each provided with grid lines on the panels.

13. A model test method for shield post-wall grouting and tube sheet uplift under high water pressure conditions, wherein a test is carried out using a model test apparatus for shield post-wall grouting and tube sheet uplift under high water pressure conditions according to claim 11, comprising the following steps:
  step 1: install the main body box and the ground stress loading system,
  step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell,
  step 3: install the grouting system,
  step 4: install the water injection system,
  step 5: fill the main body box with the model soil, burying the displacement sensor, the soil pressure sensor, and a dynamic water pressure sensor in the model soil, and install the loading plate in an upper part of the model soil, the loading plate connects to the ground stress loading system,
  step 6: apply water pressure, the water injection system injects water into the model soil through the water pipeline,
  step 7: apply ground stress, the ground stress loading system makes a load transfer evenly in the model soil through the loading plate, stop loading after the ground stress reaches a desired stress value of the water environment,
  step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box,
  step 9: after the grouting is finished, collect data through the monitoring system, summarize a pipe piece uplift law and a grouting diffusion reinforcement pattern of the pipe piece in different rings, and evaluate an effect of shield post-wall synchronous grouting,
  step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

14. The model test apparatus according to claim 1, wherein each of the adjustable pulley comprises a pulley, a bolt cap, a torsion strut, and a chassis support, both sides of the chassis support connect to the inner wall of the shield shell by bolt holes IV, an upper part of the chassis support connects to the torsion strut, a screw thread on the torsion strut connects to the bolt cap, a top perimeter of the bolt cap connects to the pulley through bolt holes III.

15. The model test apparatus according to claim 14, wherein the main body box comprises a detachable front and rear main boards, a left-side panel, a right-side panel, and the left-side panel and the right-side panel are each provided with grid lines on the panels.

16. A model test method for shield post-wall grouting and tube sheet uplift under high water pressure conditions, wherein a test is carried out using a model test apparatus for shield post-wall grouting and tube sheet uplift under high water pressure conditions according to claim 14, comprising the following steps:
  step 1: install the main body box and the ground stress loading system,
  step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell,
  step 3: install the grouting system,
  step 4: install the water injection system,
  step 5: fill the main body box with the model soil, burying the displacement sensor, the soil pressure sensor, and a dynamic water pressure sensor in the model soil, and install the loading plate in an upper part of the model soil, the loading plate connects to the ground stress loading system,
  step 6: apply water pressure, the water injection system injects water into the model soil through the water pipeline,
  step 7: apply ground stress, the ground stress loading system makes a load transfer evenly in the model soil through the loading plate, stop loading after the ground stress reaches a desired stress value of the water environment,
  step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box,
  step 9: after the grouting is finished, collect data through the monitoring system, summarize a pipe piece uplift law and a grouting diffusion reinforcement pattern of the pipe piece in different rings, and evaluate an effect of shield post-wall synchronous grouting,
  step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

17. The model test apparatus according to claim 14, wherein an inner wall of a rear end of the shield shell is provided with an annular barrier plate, multiple grouting ports are set on a face of the annular barrier plate in the circumferential direction, a delivery line of the water injection system connects to multiple slurry pipes, the slurry pipes are located in a gap between the shield shell and the tube sheet, and the slurry pipes connect to slurry injection ports one by one.

18. The model test apparatus according to claim 17, wherein the main body box comprises a detachable front and rear main boards, a left-side panel, a right-side panel, and the left-side panel and the right-side panel are each provided with grid lines on the panels.

19. A model test method for shield post-wall grouting and tube sheet uplift under high water pressure conditions, wherein a test is carried out using a model test apparatus for shield post-wall grouting and tube sheet uplift under high water pressure conditions according to claim 17, comprising the following steps:

step 1: install the main body box and the ground stress loading system, step 2: install the shield system, embedding the shield shell into the main body box at a shield shell hole, embedding a plurality of pipe pieces into a rear position of the shield shell, connecting the last pipe piece with the rear main board of the main body box with bolts, and connecting the tension apparatus with the front part of the shield shell, step 3: install the grouting system, step 4: install the water injection system, step 5: fill the main body box with the model soil, burying the displacement sensor, the soil pressure sensor, and a dynamic water pressure sensor in the model soil, and install the loading plate in an upper part of the model soil, the loading plate connects to the ground stress loading system, step 6: apply water pressure, the water injection system injects water into the model soil through the water pipeline, step 7: apply ground stress, the ground stress loading system makes a load transfer evenly in the model soil through the loading plate, stop loading after the ground stress reaches a desired stress value of the water environment, step 8: start the tension apparatus to move the shield shell outward for a horizontal digging movement, while the shield shell is moving, the grouting system injects slurry into the gap between the pipe piece and the model soil through a slurry delivery pipe, when the shield shell advances one ring, release a constraint between the pipe piece at the last end and the main board behind the main body box, step 9: after the grouting is finished, collect data through the monitoring system, summarize a pipe piece uplift law and a grouting diffusion reinforcement pattern of the pipe piece in different rings, and evaluate an effect of shield post-wall synchronous grouting, step 10: repeat the above steps from step 1 to step 9, set different parameters of ground stress pressure, water pressure, slurry type, grouting volume, grouting pressure, gap parameter between the shield shell and the pipe sheet, and shield boring speed to complete a shield post-wall synchronous grouting test under different conditions.

\* \* \* \* \*